United States Patent [19]
Glew et al.

[11] Patent Number: 5,778,407
[45] Date of Patent: Jul. 7, 1998

[54] METHODS AND APPARATUS FOR DETERMINING OPERATING CHARACTERISTICS OF A MEMORY ELEMENT BASED ON ITS PHYSICAL LOCATION

[75] Inventors: Andrew F. Glew, Hillsboro; Glenn J. Hinton, Portland; David B. Papworth, Beaverton; Michael Alan Fetterman, Hillboro; Robert P. Colwell; Frederick Jay Pollack, both of Portland, all of Oreg.

[73] Assignee: Intel Corporation, Santa Clara, Calif.

[21] Appl. No.: 667,241

[22] Filed: Jun. 21, 1996

Related U.S. Application Data

[63] Continuation of Ser. No. 171,528, Dec. 22, 1993, Pat. No. 5,561,814.
[51] Int. Cl.$^6$ ................................................ G06F 12/06
[52] U.S. Cl. ........................ 711/2; 711/5; 711/170; 395/833
[58] Field of Search ............................ 395/471, 727, 395/833; 364/DIG. 1; 711/170, 2, 5

[56] References Cited

U.S. PATENT DOCUMENTS

5,091,846  2/1992  Sachs et al.
5,210,850  5/1993  Kelly et al. ................................ 711/3
5,307,320  4/1994  Farrer et al. ......................... 365/230.01
5,357,618  10/1994  Mirza et al. .............................. 711/3
5,537,572  7/1996  Michelsen et al. ................... 711/135
5,548,737  8/1996  Edrington et al. ..................... 395/376

*Primary Examiner*—Tod R. Swann
*Assistant Examiner*—B. Peikari
*Attorney, Agent, or Firm*—Blakely, Sokoloff, Taylor & Zafman

[57] ABSTRACT

A circuit comprising a number of range registers and complimentary decoding/matching circuits is provided to a processor for determining the memory type of a physical address, thereby allowing memory operating characteristics to be determined as soon as the physical address is available in an execution stage preceding cache access. Additionally, a memory type field is provided to each address translation lookaside buffer entry of the data and instruction memory subsystem for storing the determined memory type, and the memory type determination circuit is disposed in the page miss handler, thereby allowing memory type to be determined at the same time when the physical address is determined.

7 Claims, 9 Drawing Sheets

| MT VALUE | MT MEANING |
|---|---|
| 0 | UNCACHEABLE & NON-SPECULATABLE MEMORY. LOADS/STORES PERFORMED AT RETIREMENT. |
| 1 | UNCACHEABLE, SPECULATABLE WRITE COMBINED MEMORY. LOADS CAN SPECULATE. STORES CAN BE PERFORMED AFTER RETIREMENT. |
| 2 | RESTRICTED CACHEABILITY & SPECULATABLE MEMORY. LOADS CAN SPECULATE. STORES CAN BE PERFORMED AFTER RETIREMENT. |
| 3 | UNCACHEABLE, NON-SPECULATABLE, MEMORY MAPPED INTERRUPT MEMORY. LOADS/STORES PERFORMED AT RETIREMENT. |
| 4 | WRITE THROUGH CACHEABLE & SPECULATABLE MEMORY. LOADS CAN SPECULATE. STORES CAN BE PERFORMED AFTER RETIREMENT. |
| 5 | WRITE PROTECTED CACHEABLE & SPECULATABLE MEMORY. LOADS CAN SPECULATE, BUT NO FORWARDING FROM STORE BUFFER. STORE ILLEGAL. |
| 6 | WRITE BACK CACHEABLE & SPECULATABLE MEMORY. LOADS CAN SPECULATE. STORES CAN BE PERFORMED AFTER RETIREMENT. |
| 7 | ILLEGAL MEMORY TYPE. |

| PHYSICAL ADDRESS | FIXED RANGE ENABLE | MATCH 0 | MATCH 1 | MATCH 2 | MATCH 3 | MATCH 4 | MATCH 5 | MATCH 6 | MATCH 7 | FINAL MEMORY TYPE |
|---|---|---|---|---|---|---|---|---|---|---|
| [0, 512K) | 1 | X | X | X | X | X | X | X | X | MT 64K |
| [512K, 768K) | 1 | X | X | X | X | X | X | X | X | MT 16K |
| [768K, 1M) | 1 | X | X | X | X | X | X | X | X | MT 4K |
| [1M, ∞) | 1 | 1 | ∅ | ∅ | ∅ | ∅ | ∅ | ∅ | ∅ | MT ∅ |
| X | ∅ | 1 | ∅ | ∅ | ∅ | ∅ | ∅ | ∅ | ∅ | MT ∅ |
| [1M, ∞) | 1 | ∅ | 1 | ∅ | ∅ | ∅ | ∅ | ∅ | ∅ | MT 1 |
| X | ∅ | ∅ | 1 | ∅ | ∅ | ∅ | ∅ | ∅ | ∅ | MT 1 |
| [1M, ∞) | 1 | ∅ | ∅ | 1 | ∅ | ∅ | ∅ | ∅ | ∅ | MT 2 |
| X | ∅ | ∅ | ∅ | 1 | ∅ | ∅ | ∅ | ∅ | ∅ | MT 2 |
| [1M, ∞) | 1 | ∅ | ∅ | ∅ | 1 | ∅ | ∅ | ∅ | ∅ | MT 3 |
| X | ∅ | ∅ | ∅ | ∅ | 1 | ∅ | ∅ | ∅ | ∅ | MT 3 |

*Figure 7A*

| PHYSICAL ADDRESS | FIXED RANGE ENABLE | MATCH 0 | MATCH 1 | MATCH 2 | MATCH 3 | MATCH 4 | MATCH 5 | MATCH 6 | MATCH 7 | FINAL MEMORY TYPE |
|---|---|---|---|---|---|---|---|---|---|---|
| [1M, ∞) | 1 | 0 | 0 | 0 | 0 | 1 | 0 | 0 | 0 | MT 4 |
| X | 0 | 0 | 0 | 0 | 0 | 1 | 0 | 0 | 0 | MT 4 |
| [1M, ∞) | 1 | 0 | 0 | 0 | 0 | 0 | 1 | 0 | 0 | MT 5 |
| X | 0 | 0 | 0 | 0 | 0 | 0 | 1 | 0 | 0 | MT 5 |
| [1M, ∞) | 1 | 0 | 0 | 0 | 0 | 0 | 0 | 1 | 0 | MT 6 |
| X | 0 | 0 | 0 | 0 | 0 | 0 | 0 | 1 | 0 | MT 6 |
| [1M, ∞) | 1 | 0 | 0 | 0 | 0 | 0 | 0 | 0 | 1 | MT 7 |
| X | 0 | 0 | 0 | 0 | 0 | 0 | 0 | 0 | 1 | MT 7 |
| X | X | ANY PATTERN WITH MORE THAN ONE MATCH BIT SET | | | | | | | | APPL. DEF. |
| [1M, ∞) | 1 | 0 | 0 | 0 | 0 | 0 | 0 | 0 | 0 | DEFAULTED MT |
| X | 0 | 0 | 0 | 0 | 0 | 0 | 0 | 0 | 0 | DEFAULTED MT |

*Figure 7B*

METHODS AND APPARATUS FOR DETERMINING OPERATING CHARACTERISTICS OF A MEMORY ELEMENT BASED ON ITS PHYSICAL LOCATION

This is a continuation of application Ser. No. 08/171,528, filed Dec. 22, 1993 now U.S. Pat. No. 5,561,814.

BACKGROUND OF THE INVENTION

1. Field of the Invention

The present invention relates to the field of computer systems. More specifically, the present invention relates to the determination of memory types on a computer system having multiple types of memory.

2. Background

"Memory typing" is known in the art, however it is limited in scope. Typically, a memory page is only "typed" as cacheable or non-cacheable. On some computer systems, a memory page is further "typed" as writethrough or writeback. Because of the limited scope of "typing", no formally defined memory types are really assigned or stored for the memory pages. Instead the limited number of "typing attributes" are set and stored for the memory pages. The "typing attributes" are determined and set by the memory subsystem late in the execution stage, using memory address decoding hardware external to the processor. These external memory address decoding hardware are usaully mapping or comparator based, varying in functions, complexity, and cost.

The prior art approach of having the memory subsystem determine and set the "typing attributes" has at least three disadvantages. First of all, it does not readily lend itself to supporting the implementation of write allocate by read for ownership for write cache misses. The simpler form of write allocate with invalidate is usually employed instead. Secondly, it also does not readily lend itself to supporting the implementation of speculative loads for out-of-order executions, particularly when the I/O devices can be mapped to memory. Thirdly, it does not readily lend itself to supporting the implementation of new memory types, such as write combined memory for frame buffers. While the first two disadvantages may be solved with a more sophisticated bus protocol, the third disadvantage cannot be easily overcome with a bus protocol based solution. Thus, it is desirable to be able to determine memory type in an earlier manner that overcomes these disadvantages.

Additionally, since memory type determination is often a critical performance path for existing computer systsms, it is further desirable if the earlier manner of memory type determination can embrace the best characteristics of the various mapping and comparator based external memory address decoding hardware in terms of richness in functions, yet remain simplistic in implementation and low in cost. Furthermore, the earlier manner of determination is upward compatible for applications developed under the traditional late manner of determination.

As will be disclosed, the method and apparatus of the present invention determines memory type early in the execution stage, and advantageously achieves the above described desirable results.

SUMMARY OF THE INVENTION

Under the present invention, the desirable results are advantageously achieved by providing a memory type determining circuit comprising a number of range registers and complimentary decoding/matching circuits to a processor for determining the memory type of a physical address, thereby allowing memory type to be determined as soon as the physical address is available in an execution stage preceding cache access. In one embodiment, the circuit comprises a default register, a number of variable range registers, a number of fixed range registers, a number of address matching circuits, a number of range decoders, and a priority circuit. The default register is used to store and output a default memory type. The variable range registers are used to store a number of bases and masks for a number of variable memory ranges, and a number of memory types for the variable memory ranges. The address matching circuits are used to generate a number of address matching signals corresponding to the memory types stored in the variable range registers responsive to a physical address. The fixed range registers are used to store a number of memory types for a number of fixed memory ranges of a number of memory segments. The range decoders are used to selectively output the memory types stored in the fixed range registers responsive to a physical address. Finally, the priority circuit is used to select either the default or one of the variable/fixed range memory types as the final determined memory type in an application dependent predetermined manner.

Additionally, in the presently preferred embodiment where the translation lookaside buffer and the page miss handler of the data and instruction memory subsystem is integrated with the processor, a memory type field is provided to each address translation lookaside buffer entry for storing the determined memory type, and the memory type determination circuit is disposed in the page miss handler, thereby allowing memory type to be determined at the same time when the physical address is determined.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
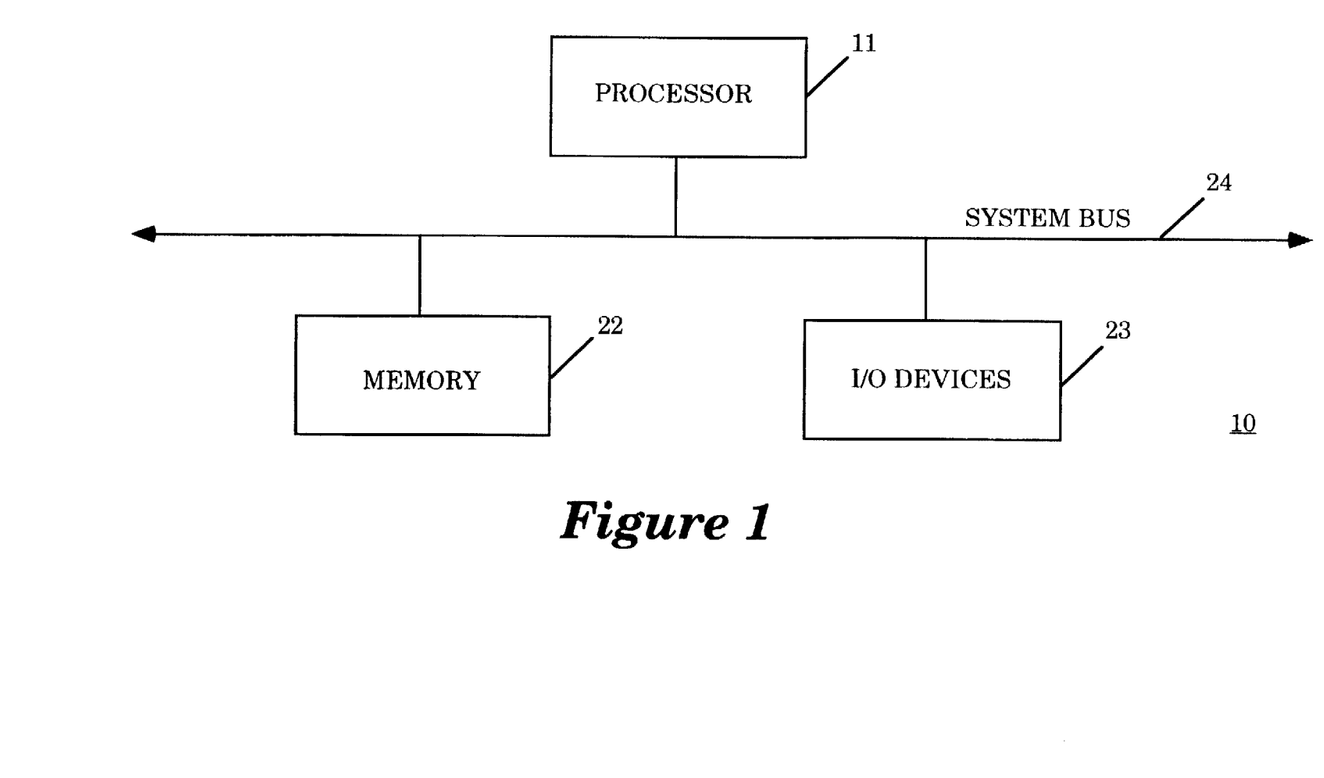
FIG. 1 illustrates an exemplary computer system incorporating the teachings of the present invention.

Referring now to FIG. 1, a block diagram illustrating an exemplary computer system incorporated with the teachings of the present invention is shown. The exemplary computer system 10 comprises a processor 11, a memory unit 22, a number of I/O devices 23, and a system bus 24, coupled to each other as shown. The processor 11 is disposed on a single silicon based chip. The exemplary computer system 10 supports virtual address spaces comprising memory locations of the memory unit 22 and the addresses of the I/O devices 23, which are partitioned into memory pages and organized into memory segments. During program execution, the processor 11 references memory space locations using linear addresses, which in turn get translated into physical addresses. The processor 11 computes a linear address using a base address, a displacement value, a scale value, an index value, and a segment value. A linear address is 32 bits long with the 20 higher order bits, which get translated, identifying a memory page, and the 12 lower order bits, which do not get translated, identifying the offset into the memory page. A physical address is 40 bits long with the 28 higher order bits being the translated portion of the linear address indicating the memory page, and the 12 lower order bits being the untranslated portion indicating the offset into the memory page.

Except for the teachings of the present invention incorporated in the processor 11, the elements 11, 23–24, are intended to represent a broad category of processors, memory units, I/O devices, and system buses found on many computer systems. Their basic functions and constitutions are well known, thus will not be otherwise further described. The teachings of the present invention incorporated in the processor 11 for determining memory type will be described in further detail below with additional references to the remaining figures. While for ease of understanding, the present invention is being described with the exemplary computer system 10, based on the description to follow, it will be appreciated that the present invention may be practiced on other computer systems configured in other manners, and/or having different addressing mechanisms.

Figure 3A:
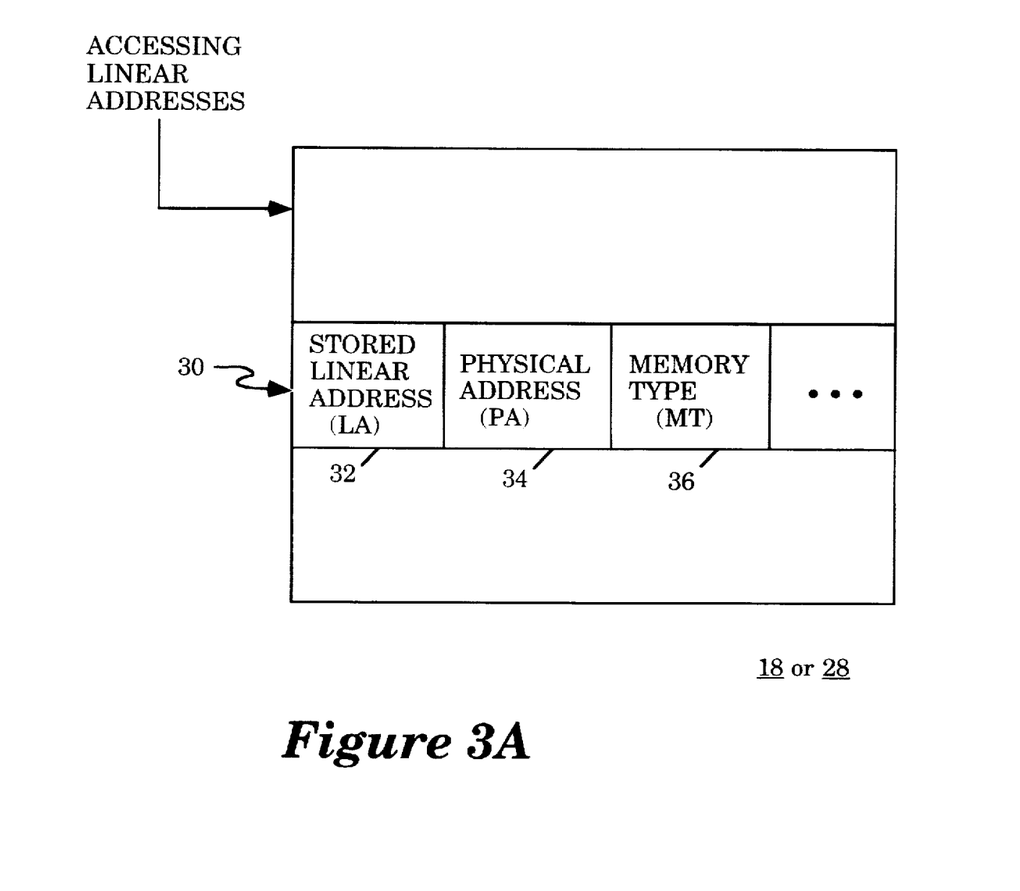
FIG. 3a illustrates the relevant portions of the preferred embodiment of the instruction/data translation lookaside buffer of FIG. 2 in further detail.
Figure 3B:
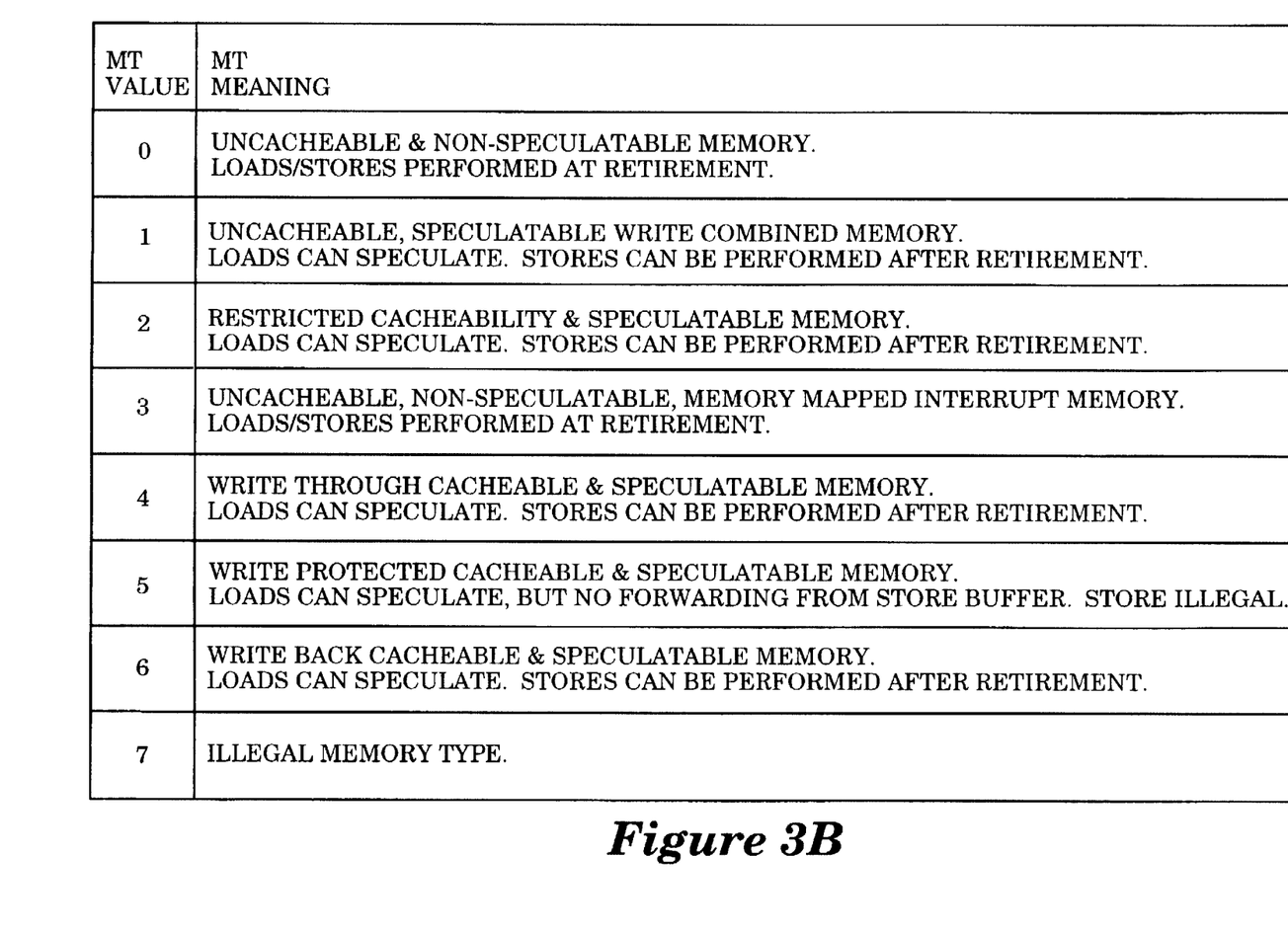
FIG. 3b illustrates exemplary memory types.
Figure 4:
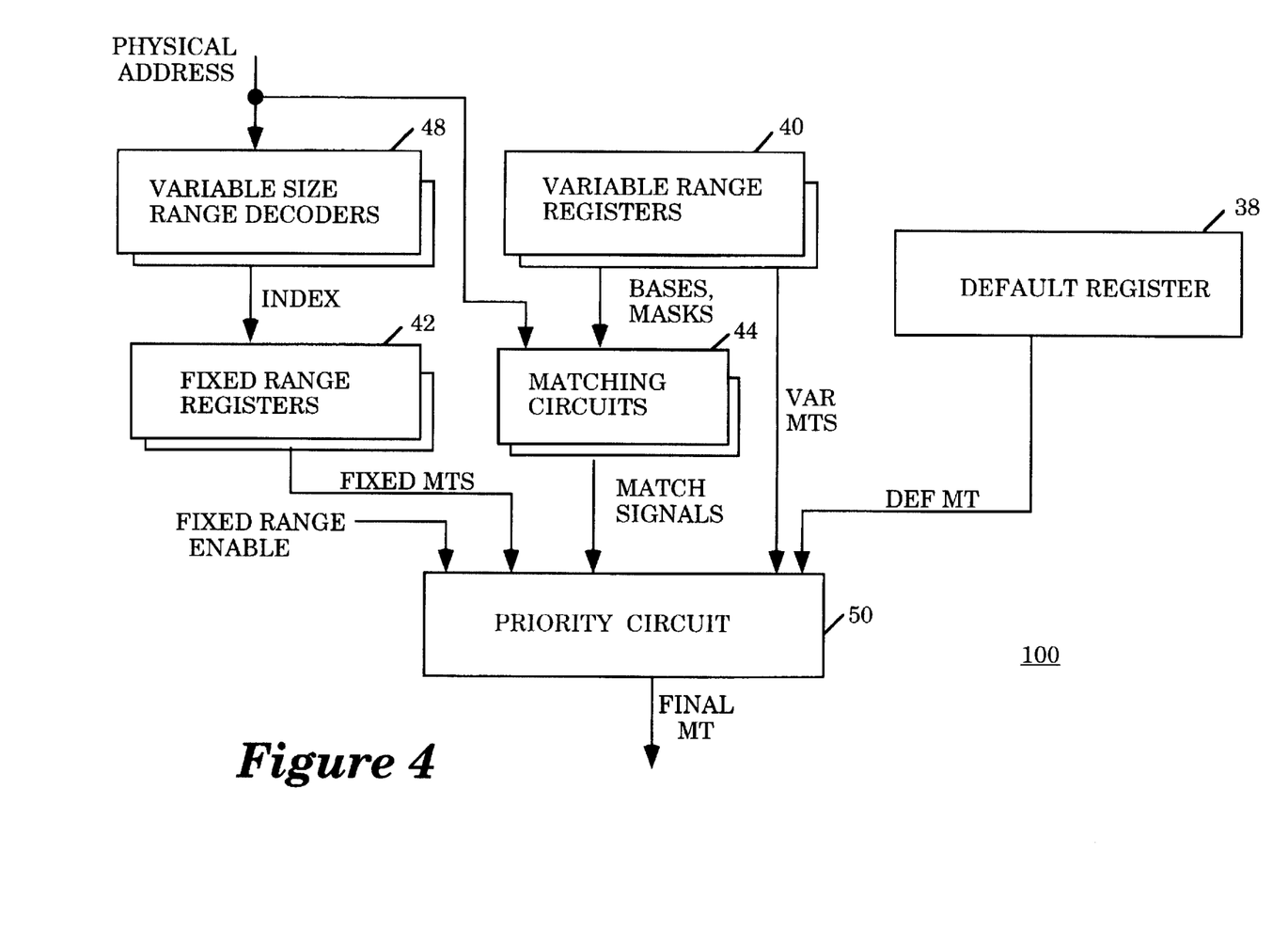
FIG. 4 illustrates one embodiment of the memory type determining circuit of the present invention, disposed preferably in the page miss handler of the processor of FIG. 2.

Skipping now to FIGS. 4, 5, 6a–6b, and 7a–7b, six diagrams illustrating one embodiment of the memory type determining circuit of the present invention incorporated in the processor of FIG. 1 are shown. As illustrated in FIG. 4, the memory type determining circuit 100 comprises a default register 38, a number of variable range registers 40, a number of fixed range registers 42, a number of address matching circuits 44, a number of range decoders 48, and a priority circuit 50 coupled to each other as shown. Cooperatively, they determine the memory type of a memory location based on the memory location's physical address. (A number of exemplary memory types are illustrated in FIG. 3b which will be described in more detail later.)

Figure 5:
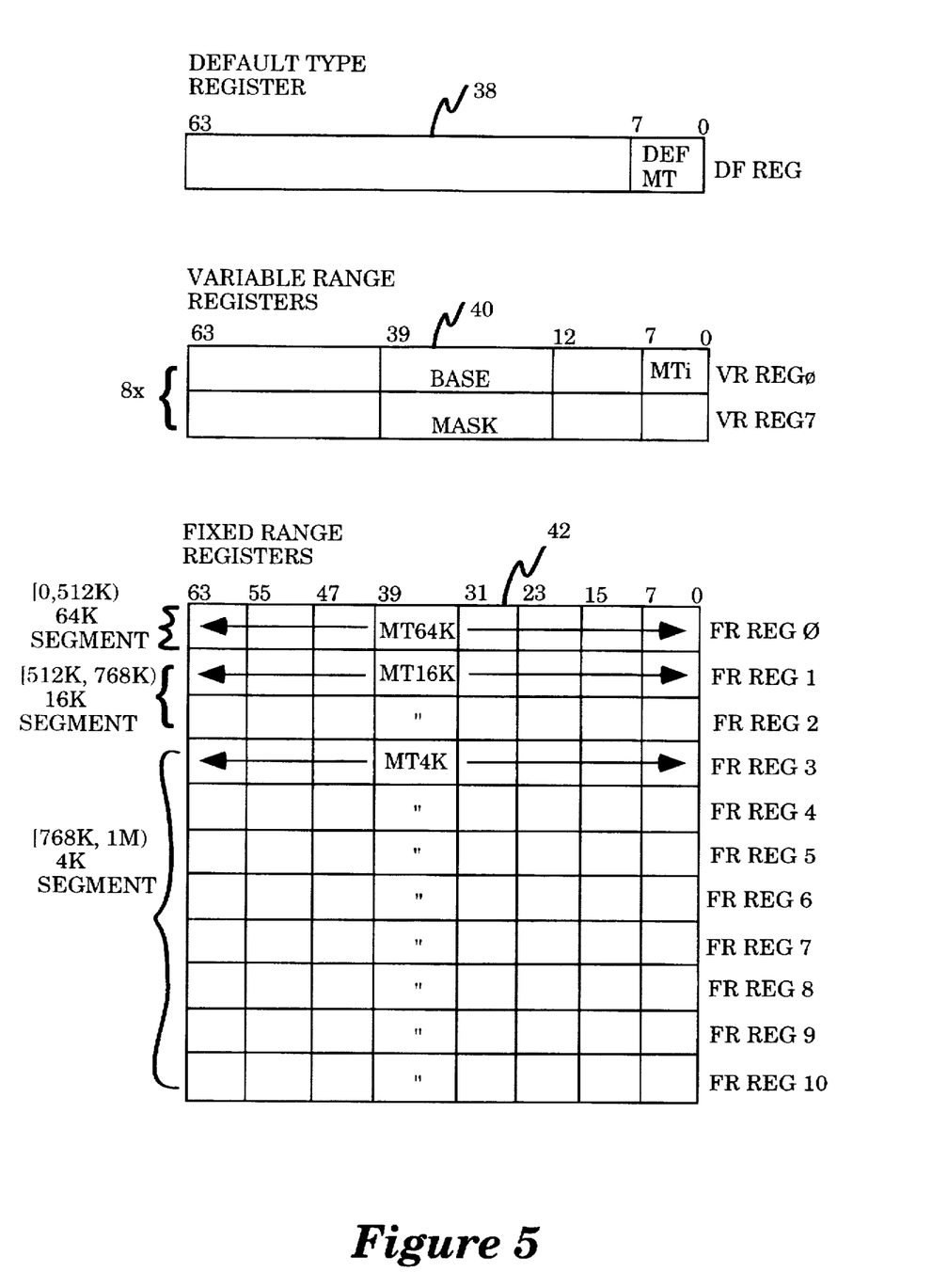
FIG. 5 illustrates the default, the variable range, and the fixed range registers of FIG. 4 in further detail.
Figure 6A:
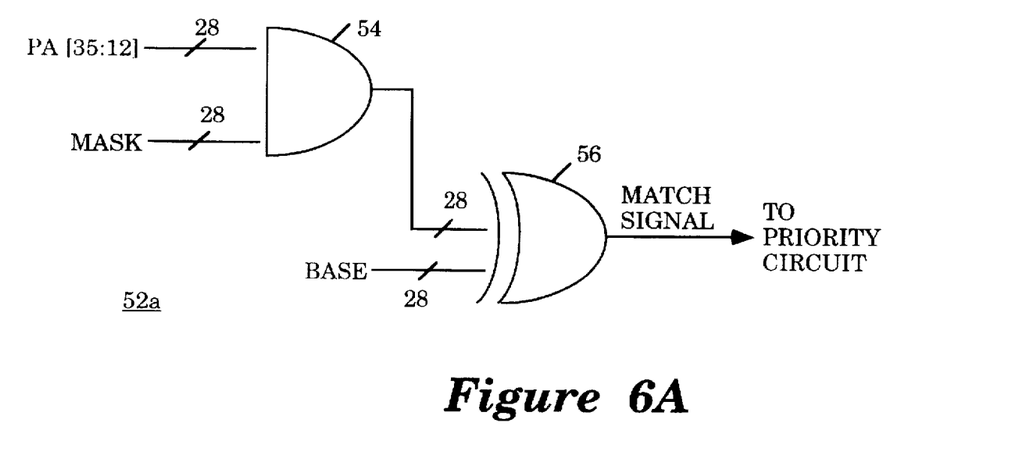
FIGS. 6a–6b illustrate two embodiments of the address matching circuits of FIG. 4 in further detail.
Figure 6B:
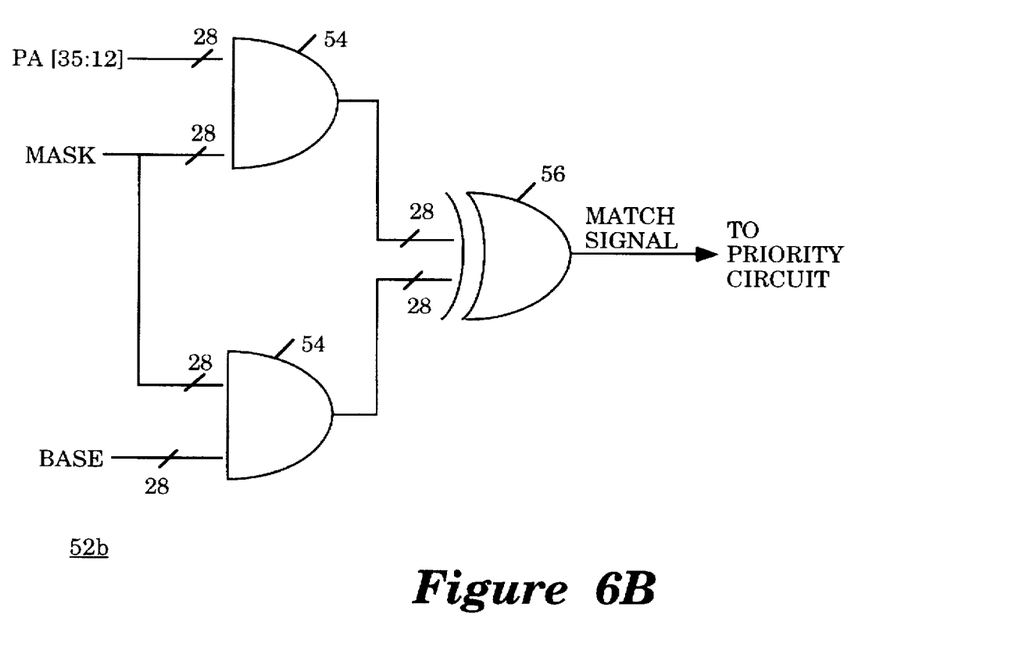

The default register 38 is used to store a defaulted memory type (see FIG. 5). For the embodiment illustrated, there are sixteen variable range registers 40 organized into eight pairs, supporting eight variable address ranges, and there are eight corresponding address matching circuits 44, one for each pair of variable range registers 40. The eight pairs of variable range registers 40 are used to store eight variable range memory types for the eight variable memory ranges, MT0, MT1, . . . MT7. Additionally, each pair of variable range registers 40 is also used to store a base, and a mask for the particular variable address range (see also FIG. 5). For the fixed address ranges, there are eleven fixed range registers 42 organized into three groups, supporting three segments of fixed address ranges, and there are three range decoders 48, one for each group of fixed range registers 42. The eleven fixed range registers 40 are used to store 8, 16, and 64 fixed range memory types for 8, 16, and 32 fixed address ranges of the three memory segments respectively, MT64 Ks, MT16 Ks, and MT4 Ks. More specifically, one of the eleven fixed range registers 40 is used to store 8 memory types for 8 64 K address ranges of the [0, 512 K) memory segment, MT64 Ks, another two of the eleven fixed range registers 40 are used to store 16 memory types for 16 16 K address ranges of the [512 K, 768 K) memory segment, MT16 Ks, and the remaining eight of the eleven fixed range registers 40 are used to store 64 memory types for 64 4 K memory ranges of the [768 K, 1 M) memory segment, MT4Ks (see also FIG. 5).

The address matching circuits 44 are used to match the physical address (PA[35:12]) against the stored bases and masks, and generate eight corresponding matching signals based on the matching results. Each of the address matching circuits 44 comprises a set of gates (See FIGS. 6a and 6b) generating a match signal having a logic value of one or zero depending on the matching result. In one embodiment, each set of gates generates a logic value of one for the match signal if the physical address (PA[35:12]) and the corresponding stored mask match the corresponding stored base, i.e. PA[35:12] & mask=base, and a logic value of zero if PA & mask do not equal base (See FIG. 6a). In an alternate embodiment, each set of gates generates a logic value of one for the match signal if the physical address (PA[35:12]) and the corresponding stored mask match the corresponding mask and base, i.e. PA[35:12] & mask=mask & base, and a logic value of zero if PA[35:12] & mask does not equal mask & base (See FIG. 6b).

The range decoders 48 are used to generate an index for each physical address. The range decoder 48 for the 64 K segments uses PA[20:18], while the range decoders 48 for the 16 K and 4 K segments use PA[18:14] and PA[18:12] respectively. The index in turn is used to access and retrieve a fixed range memory type from the fixed range registers 42. Range decoders 48 are well known in the art, and thus will not be further described.

Figure 7A:
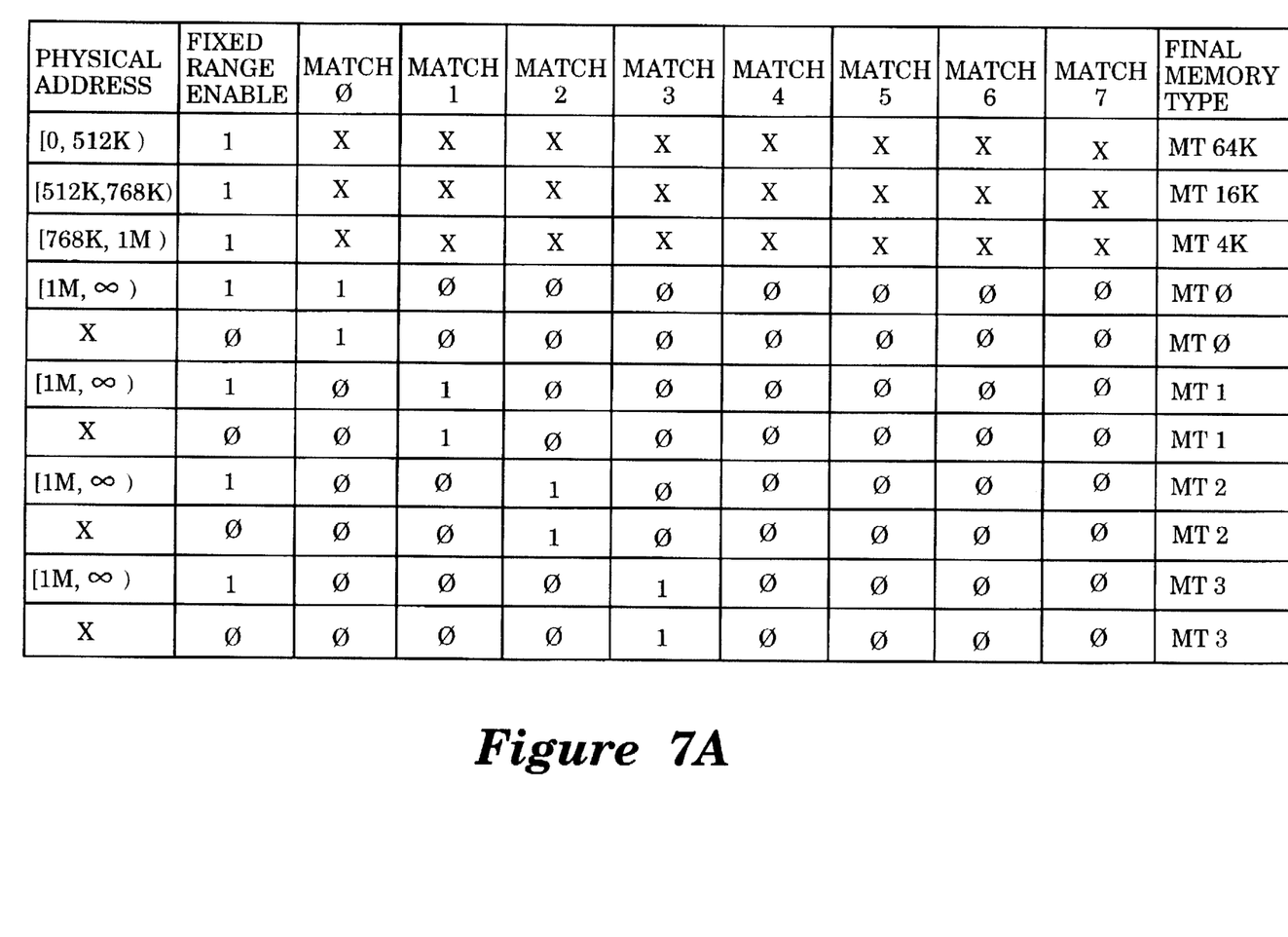
FIGS. 7a–7b illustrate the truth table implemented by one embodiment of the priority circuit of FIG. 4.
Figure 7B:
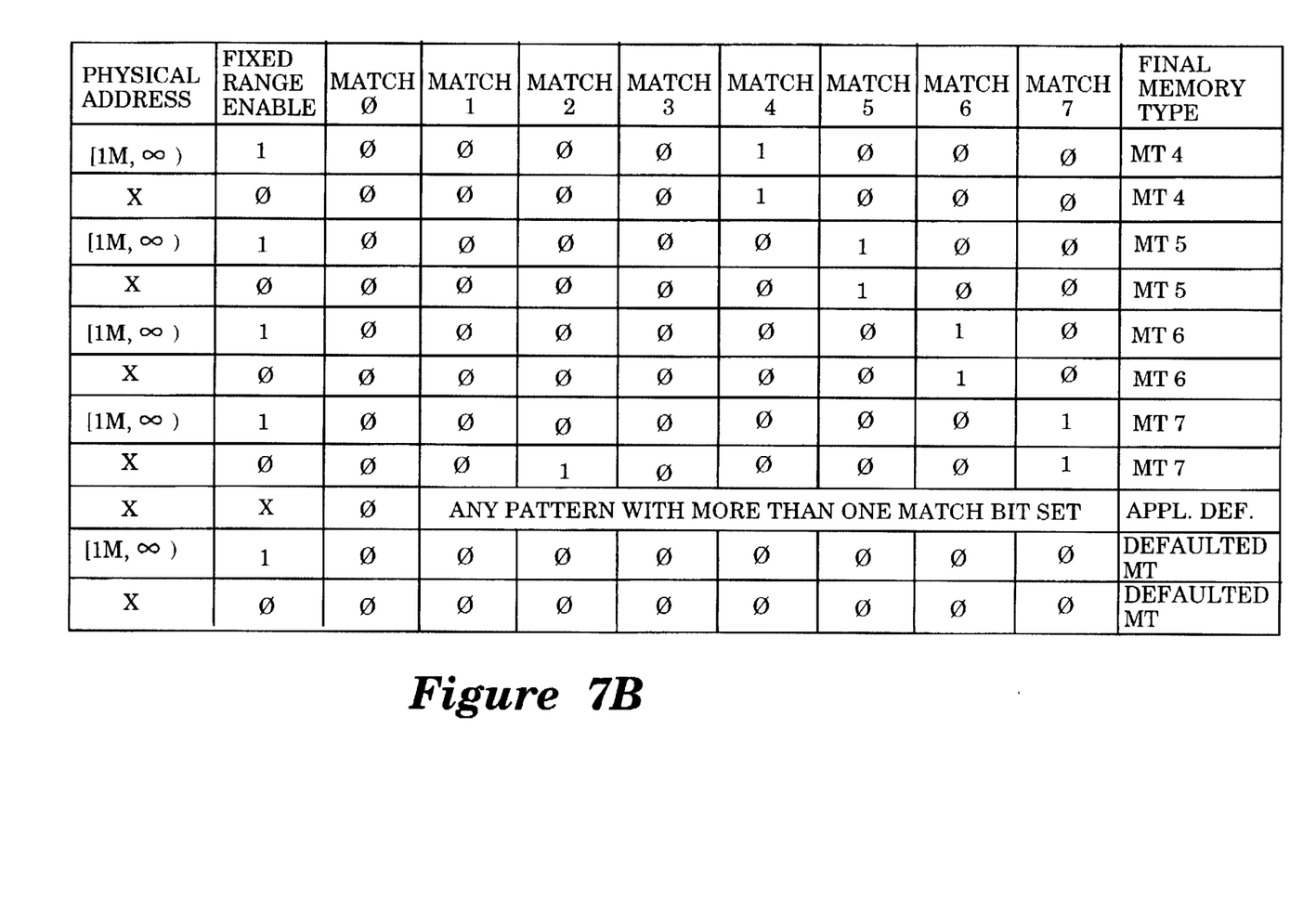

The priority circuit 50 is used to select either the default, or one of the variable/fixed memory types as the final memory type for the physical address in an application dependent predetermined manner. The priority circuit 50 receives the default memory type, the variable range memory types, the corresponding match signals, a retrieved fixed range memory type, and a fixed range enabled signal as inputs. In the embodiment illustrated, the priority circuit 50 selects the final memory type in accordance to the truth table illustrated in FIGS. 7a–7b. That is, the priority circuit 50 selects:

a) the retrieved fixed range memory type from one of the fixed range registers, i.e. MT64 K, MT16 K, or MT4 K, if fixed range is enabled, and one of these memory types is retrieved from one the fixed range address registers 42;

b) the variable range memory type corresponding to a logic one match signal, i.e. MT0, MT1, . . . or MT7, if fixed range is enabled, but no fixed range memory type is retrieved from one of the fixed range registers 42, and the match signal is the only match signal set to logic one;

c) the defaulted memory type (DEF MT), if fixed range is enabled, but no memory type is retrieved from one of the fixed range registers, and none of the match signals is set to logic one;

d) the variable range memory type corresponding to a logic one match signal, i.e. MT0, MT1, . . . or MT7, if fixed range is not enabled, and the match signal is the only match signal set to logic one, regardless whether a fixed range memory type is retrieved from one of the fixed range registers 42;

e) an application defined memory type, if fixed range is not enabled, and one or more match signal is set to logic one, regardless whether a fixed range memory type is retrieved from one of the fixed range registers 42;

f) the defaulted memory type (DEF MT), if fixed range is not enabled, and none of the match signals is set to logic one, regardless whether a fixed range memory type is retrieved from one of the fixed range registers 42.

Figure 2:
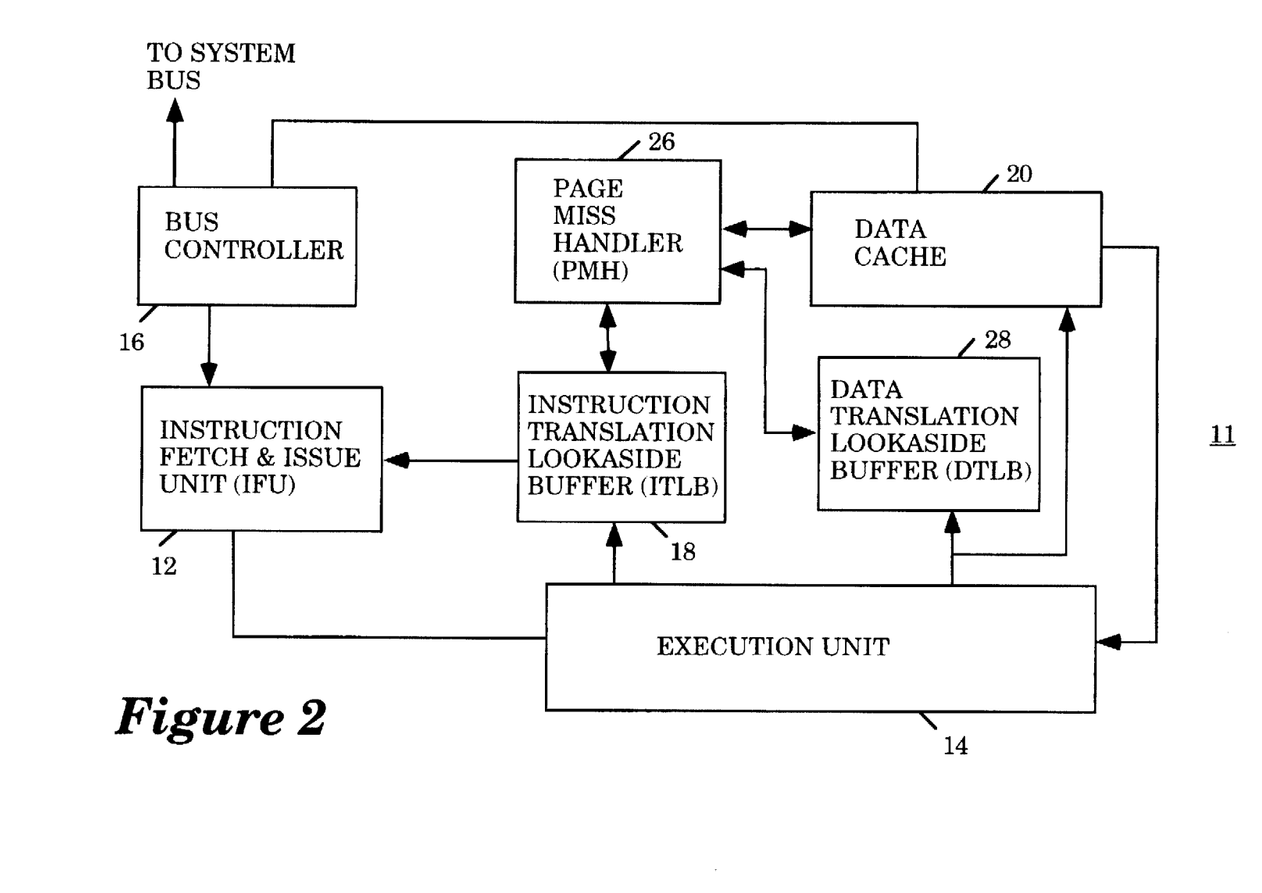
FIG. 2 illustrates one embodiment of the processor of FIG. 1 in further detail.

Thus, under the present invention, memory type of a physical address can be determined by the processor 11 as soon as the physical address is determined. Since registers as opposed to comparison circuits are used to determine the memory types, the earlier manner of memory type determination is achieved with minimal increase in hardware costs. While for ease of understanding, the memory type determination circuit of the present invention has been described with an embodiment having a particular combination of default, variable, and fixed memory type registers, it will be appreciated that the present invention may be practiced with any number of combinations of these and other memory type registers. Referring now to FIGS. 2, 3a and 3b, three block diagrams illustrating the processor of FIG. 1, its translation lookaside buffer and exemplary memory types in further detail are shown. As illustrated in FIG. 2, the processor 11 comprises an instruction fetch and issue unit (IFU) 12, an execution unit (EU) 14, a bus controller 16, an instruction and a data translation lookaside buffer (ITLB and DTLB)18 and 28, a page miss handler (PMH) 26, and a data cache 20. The IFU 12 includes an instruction cache (not shown). The elements 12-24 are coupled to each other as illustrated. Together they cooperate to fetch, issue, execute, and save execution results of instructions in a pipelined manner.

The IFU 12 fetches instructions from the memory unit 22 through the bus controller 16 and the system bus 24, stores them in the instruction cache, and issues them in order to the execution unit 14 for execution. Some instructions are fetched and issued speculatively. The EU 14 executes the instructions as soon as their operand dependencies on execution results of preceding instructions are resolved, including those instructions that are speculatively fetched and issued. In other words, the instructions are not necessarily executed in the order they were issued, and some instructions are speculatively executed. However, the execution results are retired or committed in order, and speculative execution results of mispredicted branches are purged. Data loads and stores are dispatched from the EU 14 to the data cache 20. Some data loads and stores are dispatched speculatively. The data cache 20 retires or commits the data stores in order, and respond to the data loads, regardless of whether or not the data loads are speculative, forwarding retirement/ commitment pending data if necessary.

Both the instruction cache of the IFU 12, and the data cache 20 are physically addressed. The ITLB 18 and the DTLB 28, among other functions, are used to translate the accessing linear addresses that are currently cached into physical addresses through table lookups. The PMH 26 is used to handle page misses in both the instruction cache of the IFU 12, and the data cache 20, which includes among other functions, translation of page missed linear addresses into physical addresses, and causing the allocation and filling of cache lines.

The IFU 12 is intended to represent a broad category of instruction fetching and issuing elements found in many computer systems. Its function and constitution is well known and will not be further described. The EU 14 is also intended to represent a broad category of execution units found in many computer systems, including but not limited to the execution unit described in the U.S. Pat. No. 5,463, 745 entitled Method and Apparatus For Determining The Next Instruction Pointer In An Out-Of-Order Execution Computer System, filed contemporaneously with the present application, and assigned to the assignee of the present invention, which is hereby fully incorporated by reference. The bus controller 16 and the data cache 20, are also intended to represent a broad category of these elements found in most computer systems. Their functions and constitutions are well known and will not be further described. Similarly, except for the teachings of the present invention incorporated, the basic functions and the constitutions of the ITLB 18, DTLB 28 and the PMH 26 are also well known, and will not be otherwise described. The teachings of the present invention incorporated in the ITLB 18, DTLB 28 and the PMH 26, will be described in further detail below. As illustrated in FIG. 3a, the ITLB/DTLB 18 or 28 comprises a number of address translation entries 30 for memory pages currently cached in the data cache. Each address translation entry comprises a linear address 32 of a memory page, and a corresponding physical address 34 of the memory page. Additionally, in accordance to the present invention, each address translation entry further comprises a memory type 36 for the memory locations of the memory page. As illustrated in FIG. 3b, each memory type denotes for examples, whether the memory page is cacheable/ uncacheable, if cacheable whether its restrictively cacheable and whether it is writethrough, write protected or writeback, and whether the memory page is speculatable. Together, these factors influence how load and store operations are performed. Furthermore, the PMH 26 is provided with the memory type determination circuit 100 of the present invention. The page addresses 32-34 and the memory type 36 are stored when the address translation entry is allocated.

The ITLB/DTLB 18 or 28 receives the accessing linear addresses as inputs, and in response, matches the translated portions of the accessing linear addresses against the stored linear addresses 32, and generates the corresponding physical addresses 34 and memory types 36 of the matching linear addresses 32 as outputs. In the event the translated portion of an accessing linear address fails to match any of the stored linear addresses 32, i.e. a page miss, the page miss is forwarded to the PMH 26 for handling. In the course of handling the page miss, the PMH 26 determines the memory type of the page missed linear address using the memory type determination circuit 100 of the present invention provided, and storing the determined memory type along with the addresses in the translation entry corresponding to the newly allocated cache line.

Thus, the memory type of a physical address is further advantageously determined by the processor 11 concurrent with the determination of the physical address. The earlier manner of memory type determination is achieved under the present invention without any increase to the number of pipeline stages. Since page miss generally occurs infrequently, the early determination of memory type under the present invention is also achieved with minimal increase in processing overheads. While the present invention is being further described with the earlier manner of memory type determination being performed during linear to physical address translation and the memory type determination circuit 100 of the present invention being provided to the PMH 26, based on the above descriptions, it will be appreciated that the present invention may be practiced with other types of address translation as well as other functions performed early in the execution stage.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a processor comprising address means for generating physical addresses of memory locations having memory operating characteristic types, an apparatus for determining the memory operating characteristic type of a memory location based on its physical address, said apparatus comprising:
   a) register means for storing a plurality of memory operating characteristic types for a plurality of address ranges, said memory operating characteristic types being stored in at least one of a plurality of address range description manners; and
   b) determination means coupled to said address and register means for receiving the physical address and determining the memory operating characteristic type of the memory location using said stored memory operating characteristic types and in accordance to the at least one address range description manner they are stored.

2. In a processor comprising an address generation circuit for generating physical addresses of memory locations having memory operating characteristic types, a memory typing circuit for determining the memory operating characteristic type of a memory location based on its physical address, said memory typing circuit comprising:
   a) a plurality of registers for storing a plurality of memory operating characteristic types for a plurality of address ranges, said memory operating characteristic types being stored in at least one of a plurality of address range description manners; and
   b) determination circuit coupled to said address generation circuit and registers for receiving the physical address and determining the memory operating characteristic type of the memory location using said stored memory operating characteristic types and in accordance to the at least one address range description manner they are stored.

3. In a processor comprising address means for generating physical addresses of memory locations having memory operating characteristic types, a method for determining the memory operating characteristic type of a memory location based on its physical address by said processor, said method comprising the steps of:
   a) storing a plurality of memory operating characteristic types for a plurality of address ranges within said processor in at least one of a plurality of address range description manners; and
   b) determining the memory operating characteristic type of the memory location by said processor using said stored memory operating characteristic types and in accordance to the at least one address range description manner they are stored.

4. A processor comprising:
   a) an execution unit for executing instructions, said execution unit generating linear addresses of memory locations having memory operating characteristic types; and
   b) a memory typing circuit for determining the memory operating characteristic type of a memory location based on its physical address, said memory typing circuit having
      b.1) a plurality of registers for storing a plurality of memory operating characteristic types for a plurality of address ranges, said memory operating characteristic types being stored in at least one of a plurality of address range description manners, and
      b.2) determination circuit coupled to said address generation circuit and registers for receiving the physical address and determining the memory operating characteristic type of the memory location using said stored memory operating characteristic types and in accordance to the at least one address range description manner they are stored.

5. A computer system comprising:
   a) a memory unit comprising a plurality of memory locations having memory operating characteristic types for storing data and instructions;
   b) a system bus coupled to said memory unit for interfacing with said memory unit;
   c) a processor having
      c.1) an execution unit coupled to said system bus for executing said instructions, said execution unit generating linear addresses of said memory locations, and
      c.2) a memory typing circuit for determining the memory operating characteristic type of a memory location based on its physical address, said memory typing circuit having
         c.2.1) a plurality of registers for storing a plurality of memory operating characteristic types for a plurality of address ranges, said memory operating characteristic types being stored in at least one of a plurality of address range description manners, and
         c.2.2) determination circuit coupled to said address generation circuit and registers for receiving the physical address and determining the memory operating characteristic type of the memory location using said stored memory operating characteristic types and in accordance to the at least one address range description manner they are stored; and
   d) a plurality of input/output (I/O) devices coupled to the system bus for performing I/O operations.

6. A computer system comprising:
   a) a memory unit comprising a plurality of memory locations having memory operating characteristic types for storing data and instructions, said memory operating characteristic types being composite classifications indicative of at least cacheability, write characteristics, and out-of-program-order accessibility of said memory locations;
   b) a system bus coupled to said memory unit for interfacing with said memory unit;
   c) a processor having
      c.1) an execution unit for executing instructions, said execution unit generating linear addresses of memory locations having memory operating characteristic types, and executing some instructions out of program order,
      c.2) a cache unit coupled to said execution unit for caching a subset of said memory locations, and
      c.3) a translation lookaside buffer coupled to said execution unit and said cache unit for translating linear addresses of said memory locations currently being cached into physical addresses and concurrently identifying their memory operating characteristic types; and d) a plurality of input/output (I/O) devices coupled to the system bus for performing I/O operations.

7. The computer system as set forth in claim 6 wherein, said processor further comprises:

c.4) a page miss handler coupled to said translation lookaside buffer for handling memory page misses, said page miss handler having a memory typing circuit for determining the memory operating characteristic type of a memory location based on its physical address, said memory typing circuit having c.4.1) a plurality of registers for storing a plurality of memory operating characteristic types for a plurality of address ranges, said memory operating characteristic types being stored in at least one of a plurality of address range description manners, and c.4.2) determination circuit coupled to said address generation circuit and registers for receiving the physical address and determining the memory operating characteristic type of the memory location using said stored memory operating characteristic types and in accordance to the at least one address range description manner they are stored.

* * * * *